United States Patent [19]
Barrett

[11] Patent Number: 5,886,516
[45] Date of Patent: Mar. 23, 1999

[54] SERIES RESONANT CONVERTER TRANSFORMER ASSEMBLY HAVING INTEGRAL INDUCTOR TANK ELEMENTS

[75] Inventor: Alfred Henry Barrett, Carmel, Ind.

[73] Assignee: Delco Electronics Corp., Kokomo, Ind.

[21] Appl. No.: 880,849

[22] Filed: Jun. 23, 1997

Related U.S. Application Data

[63] Continuation-in-part of Ser. No. 866,794, May 30, 1997.
[51] Int. Cl.[6] ................................................... G05B 24/02
[52] U.S. Cl. ........................... 323/331; 323/333; 323/362
[58] Field of Search .................................... 323/328, 331, 323/332, 333, 334, 335, 338, 339, 340, 355, 362, 363; 363/16, 17, 98, 132; 336/155, 160, 165

[56] References Cited

U.S. PATENT DOCUMENTS

| 4,274,071 | 6/1981 | Pfarre | 336/160 X |
| 5,434,767 | 7/1995 | Batarseh et al. | 363/16 |
| 5,438,497 | 8/1995 | Jain | 363/17 |

Primary Examiner—Edward Tso
Assistant Examiner—Y. J. Han
Attorney, Agent, or Firm—Jimmy L. Funke

[57] ABSTRACT

A transformer assembly in which an isolation transformer and two additional inductor elements of a series/parallel resonant converter are physically integrated in a cost and space-efficient design. The transformer and two inductors are integrated through the simultaneous control of the leakage inductance and the magnetizing inductance of the assembly. The primary and secondary windings of the transformer are wound in a prescribed manner on a closed-path ferromagnetic core, the magnetizing inductance of the unit being determined by the desired inductance of second inductor, and the leakage inductance of the unit being determined by the inductance of the first inductor, which predominates the total series inductance of the tank circuit. The desired magnetizing inductance is achieved by controlling an air gap disposed in the magnetic flux path of the core, while the desired leakage inductance is achieved by winding a certain portion of the secondary turns on a loosely coupled leg of the core. A non-magnetic housing and spring clamp hold the assembly and maintain the air gap constant.

8 Claims, 4 Drawing Sheets

| | | | | | Example | |
|---|---|---|---|---|---|---|
| Number of elements | 4 | 5 | 5 | 5 | 5 | |
| $F_0(max)/F_0(min)$ | >1000 | 2.00 | 1.50 | 1.20 | 1.20 | |
| $V_{in}/V_{out}$ | 1.00 | 1.00 | 1.00 | 1.00 | various/100 | |
| Rload (effective) | R | R | R | R | 30 ohms | |
| Frequency maximum output | $F_0(max)$ | $F_0(max)$ | $F_0(max)$ | $F_0(max)$ | 150 kHz | (0.10 uF) |
| Frequency of lowest zero | 0 | $0.50F_0(max)$ | $0.67F_0(max)$ | $0.83F_0(max)$ | 125 kHz | (0.0075 uF) |
| Frequency dominant pole (min) | $0.78F_0(max)$ | $0.83F_0(max)$ | $0.86F_0(max)$ | $0.93F_0(max)$ | 139 kHz | (17 uH) |
| Frequency dominant pole (max) | $1.83F_0(max)$ | $1.66F_0(max)$ | $1.51F_0(max)$ | $1.33F_0(max)$ | 200 kHz | (10 uH) |
| Frequency of load zero | $2.00F_0(max)$ | $2.00F_0(max)$ | $2.00F_0(max)$ | $2.00F_0(max)$ | 300 kHz | (38 uH) |
| C1 impedance at $F_0(max)$ | 1.046R | 0.787R | 0.578R | 0.354R | 10.62 ohms | |
| C2 impedance at $F_0(max)$ | 4.717R | 4.717R | 4.717R | 4.717R | 141.51 ohms | |
| L1 impedance at $F_0(max)$ | not used | 3.135R | 1.372R | 0.533R | 15.99 ohms | |
| L2 impedance at $F_0(max)$ | 0.314R | 0.314R | 0.314R | 0.314R | 9.42 ohms | |
| L3 impedance at $F_0(max)$ | 1.193R | 1.193R | 1.193R | 1.193R | 35.79 ohms | |

FIGURE 2

SERIES RESONANT CONVERTER TRANSFORMER ASSEMBLY HAVING INTEGRAL INDUCTOR TANK ELEMENTS

This is a continuation-in-part of U.S. patent application Ser. No. 08/866,794, Attorney Docket No. H-198,481, mailed to the U.S. Patent and Trademark Office on May 28, 1997, and assigned to the assignee of the present invention. This invention relates to transformer-coupled series/parallel resonant converters, and more particularly to a transformer assembly therefor.

BACKGROUND OF THE INVENTION

A transformer-coupled resonant converter can be generally defined as a converter in which a DC or rectified AC source is switched at a controllable frequency across the series and/or parallel combination of two or more reactive elements (a tank circuit) and in which the tank current is coupled to a load circuit through an isolation transformer. The simplest of resonant converter topologies is a two-element series converter in which the tank circuit comprises the series combination of a capacitor and an inductor. Additionally, a second inductor may be advantageously connected in parallel with the primary winding of the isolation transformer to provide boost capability—that is, allowing the converter to produce an output voltage higher than its input voltage.

Physical mechanization and packaging of the above-described converter circuits present a significant challenge, particularly when cost and package size are to be minimized. In a converter incorporating the above-described elements, for example, the circuit layout must accommodate an isolation transformer and two additional inductors. Clearly, a design the minimizes package size and cost is desired.

SUMMARY OF THE PRESENT INVENTION

The present invention is directed to an improved transformer assembly for a series/parallel resonant converter in which an isolation transformer and two additional inductor elements are physically integrated in a cost and space-efficient design.

The subject tank circuit includes at least a first inductor and first capacitor connected in series and coupled to a load circuit by an isolation transformer having primary and secondary windings, and a second inductor connected in parallel with the primary winding of the transformer for providing voltage boost capability.

The transformer assembly of the invention integrates the transformer windings and the first and second inductors of the tank circuit through the simultaneous control of the leakage inductance and the magnetizing inductance of the assembly. The primary and secondary windings of the transformer are wound in a prescribed manner on a closed-path ferromagnetic core, the magnetizing inductance of the unit being determined by the desired inductance of second inductor, and the leakage inductance of the unit being determined by the desired inductance of the first inductor, which predominates the total series inductance of the tank circuit. The desired magnetizing inductance is achieved by controlling an air gap disposed in the magnetic flux path of the core, while the desired leakage inductance is achieved by winding a certain portion of the secondary turns on a loosely coupled leg of the core.

In a preferred embodiment, the core is comprised of two U-shaped core elements with a single controlled-thickness air gap. The primary winding turns are wound entirely on one leg of the core, whereas a portion of the secondary winding turns, referred to herein as loosely coupled turns, are wound on another leg of the core. The ratio of the number of loosely coupled turns to the number of tightly coupled turns wound co-axially with the primary winding turns determines the overall leakage flux. A non-magnetic housing and spring clamp hold the assembly together and maintain the air gap at the designed value.

BRIEF DESCRIPTION OF THE DRAWINGS

FIG. 2 is a table giving exemplary values and component value ratios for the converter circuit of FIG. 1.

DETAILED DESCRIPTION OF THE DRAWINGS

Figure 1:
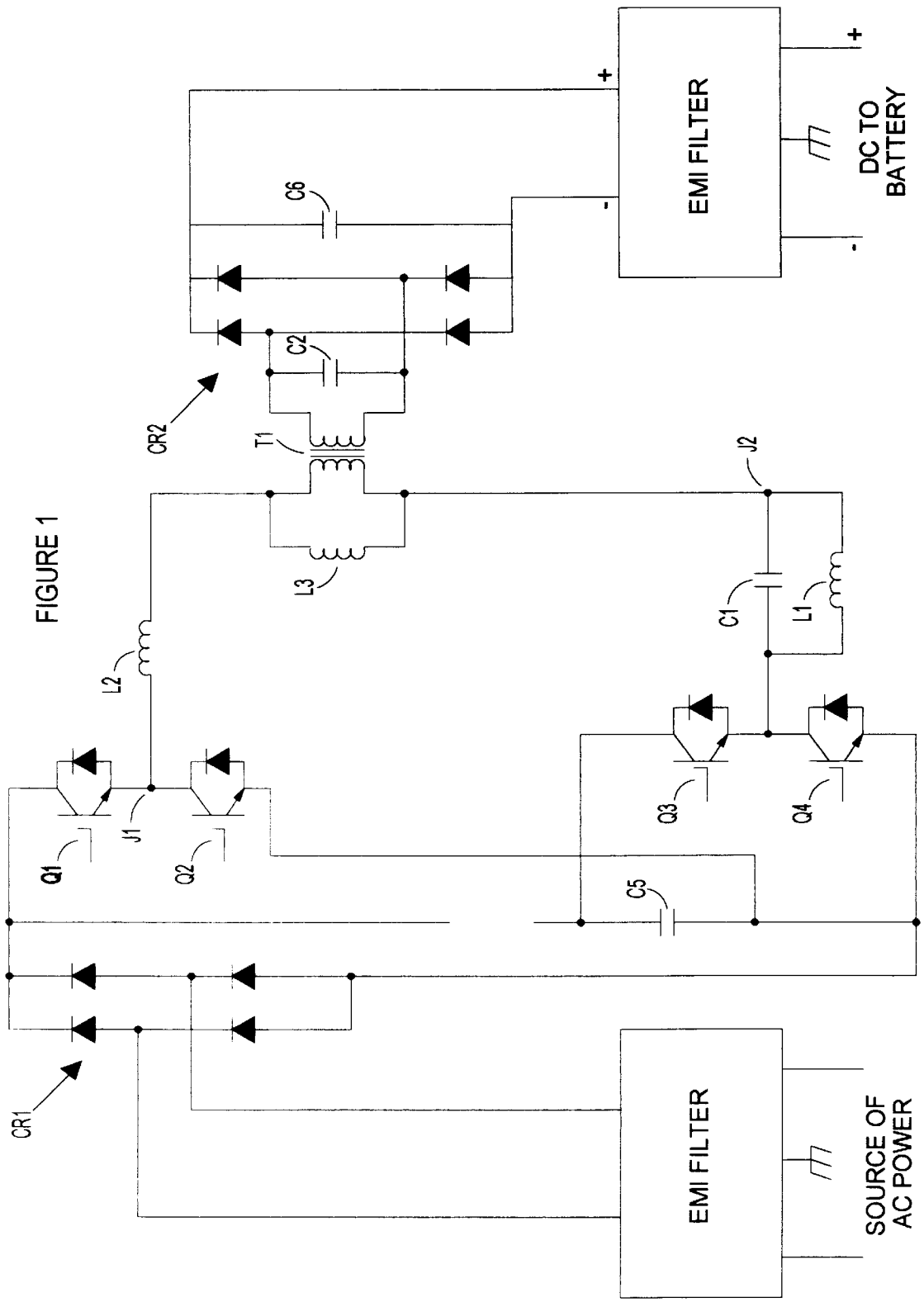
FIG. 1 is a circuit diagram of a five-element resonant converter circuit including an isolation transformer, two tank capacitors and three tank inductors.

FIG. 1 depicts a five-element converter circuit powered by an AC source and utilizing a full-wave IGBT bridge. Obviously, other mechanizations powered by a DC source, and/or utilizing a half-wave bridge or switching devices other than IGBTs are also possible. Full-wave bridges are generally preferred over half-wave bridges for their increased efficiency and flexibility. In full-bridge mechanizations, the outputs of one half-bridge may be phase-shifted relative to the other, but in the illustrated embodiment, the second half-bridge operates with a fixed phase shift of 180 degrees. As to the bridge transistors, IGBTs are generally preferred for input voltages above 200 volts, whereas MOSFETs are generally preferred for lower input voltages. The capacitor C5 serves a by-pass function and typically has a value of ten to fifty times that of C1; accordingly, the voltage at the output of the full-wave bridge rectifier CR1 is a full-wave rectified sine wave.

In the output circuit, the rectifier CR2 provides full-wave rectification of the load current. Various other circuit configurations, such as center-tapped and voltage multiplier circuits, are also feasible. The capacitor C6, like capacitor C5, has a bypass function. Therefore, the capacitance of C6 is typically ten to fifty times greater than that of capacitor C1. This assumes that transformer T1 has a turns ratio of 1:1 or does not exist. Otherwise, if one assumes that transformer T1 has a turns ratio of 1:n, then the capacitance of C6 is typically ten to fifty times $C1/(n^2)$.

The tank circuit in the converter of FIG. 1 includes five elements, capacitors C1 and C2, and inductors L1, L2 and L3. The isolation transformer T1 comprises a primary winding P in parallel with the inductor L3 and a secondary winding S in parallel with the capacitor C2. As discussed above, the inductor L3 provides boost capability, and is occasionally referred to herein as a boost inductor. Additionally, the inductor L1 operates in conjunction with the capacitor C1 to form a load independent zero in the transfer function of the tank circuit. In effect, this zero establishes a minimum switching frequency $f_{min}$ for which the output power of the converter is reduced to zero. In other words, the converter output voltage goes to zero when the switching frequency $f_o$ of the transistor bridge is reduced to the minimum frequency $f_{min}$. In the illustrated embodiment, the impedance value of L1 is chosen so that the load independent zero has a frequency of approximately 50% of the dominant resonant frequency $f_{res}$ established by the tank elements.

Transistors Q1–Q4 are switched on and off in pairs so as to produce quasi-square waves with peak-to-peak voltages essentially equal to that of the instantaneous voltage across the output of CR1, and at a frequency lower than the dominant resonant frequency $f_{res}$ of the tank, defined primarily by the impedance values of capacitor C1 and inductor L2. Since the capacitor C2 and inductor L3 are coupled in parallel with the load circuit, their influence on the frequency of the dominant pole varies with load. The switching frequency $f_o$ of the bridge transistors Q1–Q4 is controlled to maintain a desired output power, but is limited to maximum frequency $f_{max}$ of approximately 60% of the dominant resonant frequency $f_{res}$. At switching frequencies below this maximum, the output power varies proportionally and monotonically with the switching frequency. The frequency range is therefore limited to between 50% and 60% of the dominant resonant frequency $f_{res}$.

Since the converter of FIG. 1 operates in a sub-resonant mode (that is, the switching frequency $f_o$ is lower than the dominant resonant frequency $f_{res}$), the tank current flows through a conducting pair of IGBTs in a positive portion of its cycle, and then reverses through the anti-parallel diodes of the same IGBTs. After the current reverses, the IGBTs are turned off as described above so as to achieve zero-current or soft switching. When the other pair of IGBTs are turned on, any residual reverse current, plus the reverse recovery current of the anti-parallel diodes, is shunted through the IGBTs. However, the capacitor C2 operates to shorten the duration of the negative cycle of the supplied current so that the reverse current through the anti-parallel diode of the current pair of switching devices is substantially terminated by the turn on of the next pair of switching devices. This substantially eliminates the current in-rush in the next pair of switching devices, decreasing EMI, and also improves the overall efficiency of the converter.

FIG. 2 is a table showing frequency breakpoints and the relative component values of the tank components for frequency ranges of 1:1000 (or greater), 1:2, 1:1.5 and for 1:1.2. The frequency range of 1:1000 (or greater) corresponds to the circuit of FIG. 1 with the inductor L1 removed, while the other frequency ranges correspond to the circuit of FIG. 1 as shown. The assumption made in this table is that the transformer has a 1:1 turns ratio. If the transformer turns ratio is other than 1:1, as in the mechanization of this invention described below, the capacitive components on the load side of the transformer increase in proportion to the square of the turns ratio. Thus, in the Example circuit shown in the table, utilizing a transformer turns ratio of 5:1 would increase the capacitance of capacitor C2 from 0.0075 $\mu$F to 0.19 $\mu$F. The Vin/Vout ratio for AC input mechanizations is given in Vrms/Vdc. Rload (effective) is calculated as Vout/Iload at rated output. The frequency breakpoints are given in relationship to the operating frequency at full output, Fo(max). The impedance values of the five-element components are given in relationship to R and at Fo(max).

According to this invention, the isolation transformer T1 and the inductors L2–L3 of the above-described converter circuit are integrated into a single transformer assembly. The primary and secondary windings of the transformer are wound in a prescribed manner on a closed-path ferromagnetic core, the magnetizing inductance of the unit being determined by the desired inductance of inductor L3, and the leakage inductance of the unit being determined by the desired inductance of inductor L2, which predominates the total series inductance of the tank circuit. The desired magnetizing inductance is achieved by controlling an air gap disposed in the magnetic flux path of the core, while the desired leakage inductance is achieved by winding a certain portion of the secondary turns on a loosely coupled leg of the core. By convention, the magnetizing inductance is defined as the inductance of the primary winding with the secondary winding(s) open-circuited, while the leakage inductance is defined as the inductance of the primary winding with the secondary winding(s) short-circuited.

Figure 3:
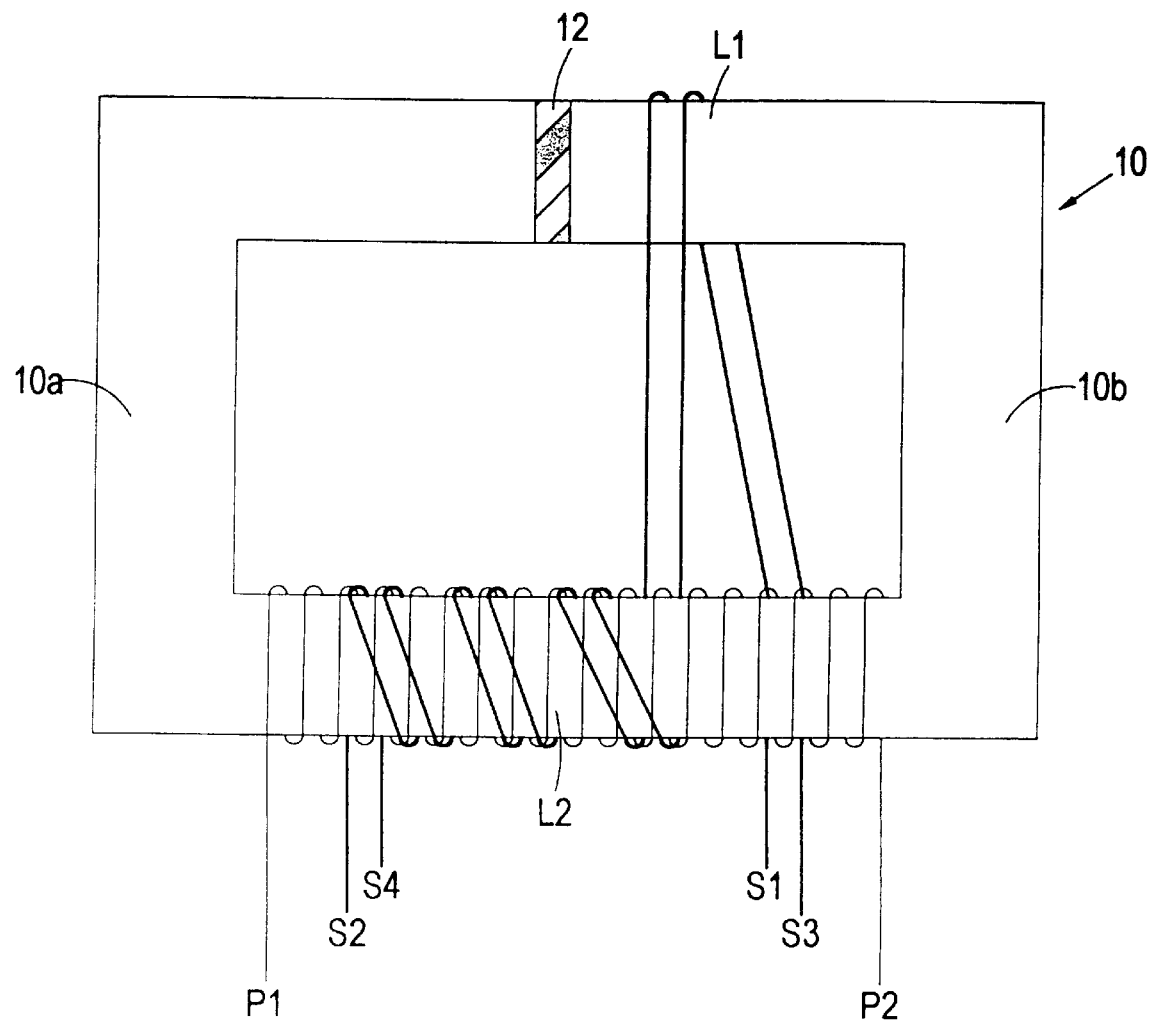
FIG. 3 is a schematic electrical diagram of a transformer assembly according to this invention.
Figure 4:
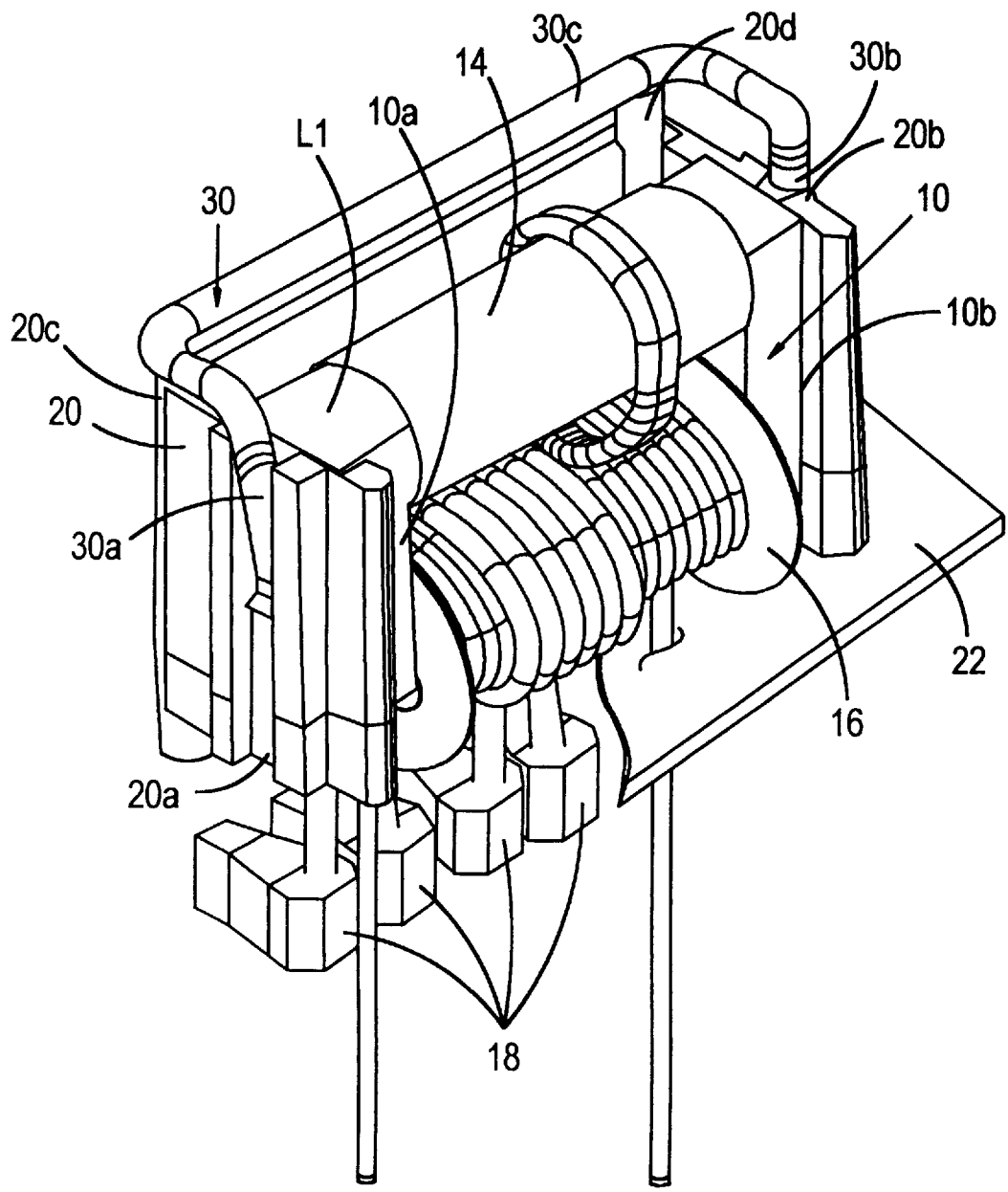
FIG. 4 is a isometric view of the transformer assembly depicted in FIG. 3.

The integrated transformer assembly of this invention is shown schematically in FIG. 3 and isometrically in FIG. 4. In each instance, the secondary winding is shown as including two separate sets of turns wound in bi-filar fashion. In certain applications, this approach is desirable since it lends flexibility to the converter in that the winding sets may be connected in parallel for a low voltage output or in series for a higher voltage output. If desired, of course, a single secondary winding with the same number of total turns could be used alternatively.

Referring to FIGS. 3–4, the transformer assembly comprises a rectangular closed-path ferromagnetic core generally designated by the reference numeral 10, primary and secondary windings P1–P2, S1–S2, S3–S4 wound on the core 10, a non-magnetic housing 20 and a non-magnetic spring clamp 30. The assembly is designed to mount on a circuit board 22, with the winding leads protruding through the 10 circuit board 22 for connection with the remainder of the converter circuit. Referring to FIG. 1, it will be apparent that one of the primary winding leads P1 or P2 will connect to the junction J1 between bridge transistors Q1 and Q2, while the other primary winding lead will connect to the junction J2 of tank capacitor C1 and inductor L1. The secondary winding leads are connected across tank capacitor C2 as shown, either in series to form a high voltage output or in parallel to form a low voltage output.

The closed-path core 10 is formed with two core elements 10a and 10b joined to form a rectangular profile as shown. In the illustrated embodiment, the core elements 10a and 10b are U-shaped, of rectangular crossection, and are joined to define upper and lower legs L1 and L2, as viewed in FIGS. 3–4. Alternatively, U-shaped and I-shaped core elements may be utilized. The air gaps where the two core elements 10a–10b abut are controlled to achieve the desired magnetizing inductance, as described above. In the illustrated embodiment, this is achieved by making one or both of the core element sections which form the upper leg L1 somewhat shorter than the core sections forming the lower leg L2, and inserting an insulator 12 of suitable thickness between the upper leg core portions. In this construction, the core element sections forming the lower leg L2 are brought together as tightly as possible so that the controlled air gap is determined substantially by the thickness of the insulator 12. In a mechanization of the present invention, the insulator 12 comprised a suitable thickness of standard F4 fiberglass printed circuit board. This particular construction, while not essential to the invention, is particularly advantageous because it permits the air gap to be disposed remote from the windings, avoiding heating losses due to fringing flux in the vicinity of the air gap.

Prior to joining the core sections 10a and 10b, the upper and lower legs L1 and L2 are insulated with fiberglass sleeves 14, as best seen on the upper leg L1 of FIG. 4. The lower leg L2 is additionally fitted with a bobbin due to the number of primary winding turns installed thereon.

Since the converter is designed to operate at a frequency of approximately 150 kHz, litz wire is used for the primary and secondary windings. In a mechanization of the present invention, the primary winding was formed of twenty (20)

turns of 225/40 litz wire, and the secondary windings were formed of four (4) turns each of 500/40 litz wire. In FIG. 4, the winding ends are shown as being terminated with so-called quick-disconnect connectors 18.

When installing the windings, the primary winding P is first wound around the lower leg L2 of the core 10. Then the secondary windings S1–S2 and S3–S4 are wound together, one turn around the upper leg L1 remote from the air gap insulator 12 and three turns around the lower leg L2 coaxial with the primary winding P. Thus, one portion of the secondary winding turns are loosely coupled with the primary winding turns, and the other portion of the secondary winding turns are tightly coupled with the primary winding turns. As indicated above, the ratio of tightly coupled turns to loosely coupled turns of the secondary winding determines the leakage inductance of the unit, and therefore, the inductance of tank inductor L2. In a mechanization where the ratio of L3 to L2 is approximately 4, and a total of four bi-filar turns are desired, the proper inductance is achieved by placing approximately onefourth of the secondary turns on the upper leg L1 as shown.

Once wound, the core and winding assembly is slipped into the non-magnetic housing 20 (which may be plastic, for example) which holds the core elements in place, both longitudinally and laterally. The non-magnetic spring 30 (which may be of brass, for example) is then installed around the longitudinal ends of the housing 20 to tightly clamp the core elements 10a and 10b together, maintaining a constant air gap therebetween. The clamp 30 is retained on the housing 20 by a pair of slots 20a and 20b formed on opposite ends of the housing 20, which receive end portions 30a and 30b of spring clamp 30. The mid-section 30c of clamp 30 seats on a pair of housing posts 20c and 20d.

In summary, the present invention provides a novel transformer assembly for a resonant converter circuit that physically combines an isolation transformer with a boost inductor L3 and a series tank inductor L2 by controlling the core air gap and the ratio of loosely coupled turns to tightly coupled turns. In practice, both the air gap and the ratio of loosely coupled turns to tightly coupled turns can be determined empirically. Fortunately, the magnetizing inductance is substantially independent of the ratio of loosely coupled turns to tightly coupled turns, and the leakage inductance is substantially independent of the air gap geometry. Accordingly, one of the parameters may be changed without significantly influencing the other parameter.

In view of the above, it will be obvious that many design variations are possible within the scope of this invention. Accordingly, the scope of this invention is not limited to the illustrated embodiments, but rather, is defined by the appended claims.

The embodiments of the invention in which an exclusive property or privilege in claimed are defined as follows:

1. A transformer assembly for a resonant converter configured to supply current from a source to a load circuit through a resonant tank circuit and an isolation transformer, the resonant tank circuit including a tank inductance and tank capacitor connected in series with a primary winding of said isolation transformer and a boost inductance connected in parallel with the primary winding of said isolation transformer, said transformer assembly comprising:

a ferromagnetic core having first and second parallel leg elements separated by a magnetic air gap;

a first multi-turn winding constituting the primary winding of said isolation transformer, all of the turns of said first winding being wound on the first leg of said core; and a second multi-turn winding constituting the secondary winding of said isolation transformer, said second winding having a first tightly coupled portion of its turns wound on the first leg of said core co-axial with said primary winding, and a second loosely coupled portion of its turns wound on the second leg of said core, wherein said boost inductance is defined by the air gap between said first and second legs of said core, and the series inductance is defined by the ratio of said tightly coupled turns to said loosely coupled turns of said secondary winding.

2. The transformer assembly of claim 1, wherein the ferromagnetic core comprises two U-shaped core elements having abutting end portions such that first end portions of said core elements define said first leg element, and second end portions of said core elements defined said second leg element; and wherein the air gap is defined by a controlled separation between at least one of said first and second end portions.

3. The transformer assembly of claim 2, including a non-magnetic housing having end portions disposed at longitudinal ends of said core, and a non-magnetic spring engaging the end portions of said housing.

4. The transformer assembly of claim 2, wherein at least one of said second end portions of said core elements is shorter than a corresponding first end portion so that the air gap is defined by a resulting separation between said first end portions of said core elements.

5. The transformer assembly of claim 4, wherein said air gap is disposed remote from said loosely coupled turns of said secondary winding.

6. The transformer assembly of claim 1, wherein said primary and secondary windings are formed of litz wire.

7. The transformer assembly of claim 1, including first insulating sleeve disposed between said primary winding turns and the first leg of said core, and a second insulating sleeve disposed between said loosely coupled secondary winding turns and the second leg of said core.

8. The transformer assembly of claim 1, including a non-magnetic housing configured to mount on a circuit board, and disposed at least around longitudinal ends of said core to retain said core elements in position with respect to said circuit board.

* * * * *